United States Patent
Liu et al.

(10) Patent No.: US 11,954,828 B2
(45) Date of Patent: Apr. 9, 2024

(54) PORTRAIT STYLIZATION FRAMEWORK USING A TWO-PATH IMAGE STYLIZATION AND BLENDING

(71) Applicant: Lemon Inc., Grand Cayman (KY)

(72) Inventors: Jing Liu, Los Angeles, CA (US); Chunpong Lai, Los Angeles, CA (US); Guoxian Song, Singapore (SG); Linjie Luo, Los Angeles, CA (US); Ye Yuan, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 176 days.

(21) Appl. No.: 17/501,990

(22) Filed: Oct. 14, 2021

(65) Prior Publication Data

US 2023/0124252 A1     Apr. 20, 2023

(51) Int. Cl.
*G06T 5/00*   (2006.01)
*G06T 3/40*   (2006.01)
(Continued)

(52) U.S. Cl.
CPC ........... *G06T 5/005* (2013.01); *G06T 3/40* (2013.01); *G06T 5/50* (2013.01); *G06T 7/11* (2017.01);
(Continued)

(58) Field of Classification Search
CPC ......... G06T 5/005; G06T 3/40; G06T 11/001; G06T 2207/10024; G06T 7/11;
(Continued)

(56) References Cited

U.S. PATENT DOCUMENTS 6,975,434 B1 * 12/2005 Pilu ..................... H04N 1/3876
                                                          382/284
10,863,105 B1    12/2020 Rosengaus et al.
(Continued)

FOREIGN PATENT DOCUMENTS

| CN | 109191414 A | 1/2019 |
| CN | 112037121 A | 12/2020 |
| CN | 112884637 A | 6/2021 |

OTHER PUBLICATIONS

International Search Report dated May 18, 2023 for International Application No. PCT/SG2022/050703.
(Continued)

*Primary Examiner* — Phi Hoang
(74) *Attorney, Agent, or Firm* — Faegre Drinker Biddle & Reath LLP (57) ABSTRACT

Systems and method directed to generating a stylized image are disclosed. In particular, the method includes, in a first data path, (a) applying first stylization to an input image and (b) applying enlargement to the stylized image from (a). The method also includes, in a second data path, (c) applying segmentation to the input image to identify a face region of the input image and generate a mask image, and (d) applying second stylization to an entirety of the input image and inpainting to the identified face region of the stylized image.
(Continued)

Machine-assisted blending is performed based on (1) the stylized image after the enlargement from the first data path, (2) the inpainted image from the second data path, and (3) the mask image, in order to obtain a final stylized image.

20 Claims, 6 Drawing Sheets

(51) Int. Cl.
    *G06T 5/50*     (2006.01)
    *G06T 7/11*     (2017.01)
    *G06T 11/00*     (2006.01)

(52) U.S. Cl.
    CPC .. *G06T 11/001* (2013.01); *G06T 2207/10024* (2013.01); *G06T 2207/20084* (2013.01); *G06T 2207/20221* (2013.01); *G06T 2207/30201* (2013.01)

(58) Field of Classification Search
    CPC . G06T 5/50; G06T 11/60; G06T 11/00; G06T 2207/30201; G06T 2207/20221; G06T 2207/20084
    See application file for complete search history.

(56) References Cited

U.S. PATENT DOCUMENTS

| | | | | |
|---|---|---|---|---|
| 2017/0039692 | A1* | 2/2017 | Balestrieri | H04N 23/80 |
| 2019/0130192 | A1* | 5/2019 | Kauffmann | G11B 27/031 |
| 2020/0372692 | A1* | 11/2020 | Ge | G06V 40/165 |
| 2021/0067756 | A1* | 3/2021 | Goodrich | G06T 7/571 |
| 2021/0216776 | A1* | 7/2021 | Hare | G06T 7/215 |
| 2021/0217443 | A1* | 7/2021 | Abraham | G11B 27/02 |
| 2021/0374905 | A1* | 12/2021 | Duan | G06F 3/04842 |
| 2022/0222872 | A1* | 7/2022 | Ghosh | G06T 11/001 |
| 2022/0366544 | A1* | 11/2022 | Kudelski | G06T 3/60 |
| 2022/0391611 | A1* | 12/2022 | Kalarot | G06V 40/172 |

OTHER PUBLICATIONS

Song, G. et al., AgileGAN: Stylizing Portraits by Inversion-Consistent Transfer Learning. ACM Transactions on Graphics, Jul. 19, 2021, vol. 40, No. 4, pp. 1-13 [Retrieved on Apr. 24, 2023] <DOI: 10.1145/3450626.3459771>.

* cited by examiner

PORTRAIT STYLIZATION FRAMEWORK USING A TWO-PATH IMAGE STYLIZATION AND BLENDING

BACKGROUND

Image-to-image translation methods are used in the field of computerized image modification to "translate" images from a source domain to a target domain using paired datasets in a supervised manner or using unpaired datasets in an unsupervised setting. These methods have been explored for portrait stylization, e.g. self-to-anime and cartoon. Recent portrait stylization pipelines are built on a pre-trained model of a high-resolution generative neural network. In some examples, the image to be translated is a picture or photograph provided by a user, where the picture includes a person and a background. However, known translation methods often have difficulty in providing a stylized image which takes into account the person and the background separately. That is, such methods often stylize the person and the background together, or cause pixilation around the person's face or body when stylized and inserted into the background, which may or may not be stylized. Therefore, there is a need for improved translation methods of such images where the person and the background are separately analyzed and processed.

SUMMARY

As disclosed herein, different types of portrait stylization pipelines implement different methods or frameworks of stylization. For example, StyleGAN-based methods and frameworks have focused on finding the best latent inversion mapping for reconstructing input images. In some examples, an AgileGAN framework is implemented that generates high quality stylistic portraits via inversion-consistent transfer learning. The AgileGAN framework includes a hierarchical variational autoencoder; the hierarchical variational autoencoder generates an inverse mapped distribution that conforms to the original latent Gaussian distribution provided by a StyleGAN-based network, while augmenting the original latent space to a multi-resolution latent space so as to provide encoding for different levels of detail. Additional information about GAN networks, including StyleGAN-based networks and StyleGAN2, can be found in the following printed papers: "A Style-Based Generator Architecture for Generative Adversarial Networks" to T. Karras, S. Laine, and T. Aila., in Proc. IEEE/CVF Conference on Computer Vision and Pattern Recognition, 2019 and "Analyzing and Improving the Image Quality of StyleGAN" to T. Karras, S. Laine, M. Aittala, J. Hellsten, J. Lehtinen, and T. Aila, in Proc. IEEE/CVF Conference on Computer Vision and Patter Recognition, 2020 both of which are incorporated herein by reference, for all that they teach and all purposes.

In accordance with at least one example of the present disclosure, a method for generating a stylized image is described. The method may include, in a first data path, (a) applying first stylization to an input image, and (b) applying enlargement to the stylized image from (a). In a second data path, the method may include (c) applying segmentation to the input image to identify a face region of the input image and generate a mask image, and (d) applying second stylization to an entirety of the input image and inpainting to the identified face region of the stylized image. The method then includes performing machine-assisted blending based on (1) the stylized image after the enlargement from the first data path, (2) the inpainted image from the second data path, and (3) the mask image, in order to obtain a final stylized image.

In one example of the method, the method further includes, in the second data path, (e) partially inserting the face region from the input image into the inpainted image from (d), and (f) performing color transfer between the input image and the partially inserted image from (e).

In one example of the method, the method further includes, in the first data path, (g) prior to applying the first stylization in (a), normalizing the input image, (h) after applying the enlargement in (b), applying segmentation to the stylized image from (b) to identify the face region of the stylized image, and (i) aligning the identified face region of the stylized image from (b) with the input image before the normalizing.

In one example of the method, the machine-assisted blending is Laplacian pyramid blending.

In one example of the method, the first stylization and the second stylization are performed using at least one trained generative adversarial network (GAN) generator.

In one example of the method, the trained GAN generator comprises an AgileGAN generator or a StyleGAN2 generator.

In one example of the method, the first stylization is different from the second stylization.

In one example of the method, the first data path and the second data path are implemented simultaneously.

In one example of the method, the first data path is implemented before or after the second data path.

In accordance with at least one example of the present disclosure, a system configured to generate a stylized image is described. The system may include a processor and memory including instructions, which when executed by the processor, causes the processor to, in a first data path, (a) apply first stylization to an input image, and (b) apply enlargement to the stylized image from (a). The instructions also cause the processor to, in a second data path, (c) apply segmentation to the input image to identify a face region of the input image and generate a mask image, and (d) apply second stylization to an entirety of the input image and inpainting to the identified face region of the stylized image. The instructions then cause the processor to perform machine-assisted blending based on (1) the stylized image after the enlargement from the first data path, (2) the inpainted image from the second data path, and (3) the mask image to obtain a final stylized image.

In one example of the system, the instructions, when executed by the processor, further cause the processor to, in the second data path, (e) partially inserting the face region from the input image into the inpainted image from (d), and (f) performing color transfer between the input image and the partially inserted image from (e).

In one example of the system, the instructions, when executed by the processor, cause the processor to, in the first data path, (g) prior to applying the first stylization in (a), normalize the input image, (h) after applying the enlargement in (b), apply segmentation to the stylized image from (b) to identify the face region of the stylized image, and (i) align the identified face region of the stylized image from (b) with the input image before the normalizing.

In one example of the system, the machine-assisted blending is Laplacian pyramid blending.

In one example of the system, the first stylization and the second stylization are performed using at least one trained generative adversarial network (GAN) generator.

In one example of the system, the trained GAN generator comprises an AgileGAN generator or a StyleGAN2 generator.

In one example of the system, the first stylization is different from the second stylization In one example of the system, the first data path and the second data path are implemented simultaneously.

In one example of the system, the first data path is implemented before or after the second data path.

In accordance with at least one example of the present disclosure, a computer-readable storage medium including instructions for generating a stylized image is disclosed. The computer-readable storage medium may include instructions, which when executed by a processor, cause the processor to, in a first data path, (a) apply first stylization to an input image, and (b) apply enlargement to the stylized image from (a). The instructions also cause the processor to, in a second data path, (c) apply segmentation to the input image to identify a face region of the input image and generate a mask image, and (d) apply second stylization to an entirety of the input image and inpainting to the identified face region of the stylized image. The instructions further cause the processor to perform machine-assisted blending based on (1) the stylized image after the enlargement from the first data path, (2) the inpainted image from the second data path, and (3) the mask image to obtain a final stylized image.

In one example of the computer-readable storage medium, the instructions further cause the processor to, in the second data path, (e) partially inserting the face region from the input image into the inpainted image from (d), and (f) performing color transfer between the input image and the partially inserted image from (e). The instructions further cause the processor to, in the first data path, (g) prior to applying the first stylization in (a), normalize the input image, (h) after applying the enlargement in (b), apply segmentation to the stylized image from (b) to identify the face region of the stylized image, and (i) align the identified face region of the stylized image from (b) with the input image before the normalizing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylizing facial images in an artistic manner has been explored in the context of non-photorealistic rendering. Early approaches relied on low level histogram matching using linear filters. Neural style transfer, by matching feature statistics in convolutional layers, led to early exciting results via deep learning. Since then, several improvements directed to enforcing local patterns in deep feature space via a Markov random field (MRF) and extending style transfer to video and improved the quality by imposing temporal constraints have been proposed. Although these methods can achieve generally compelling results for several artistic styles, they usually fail on styles involving significant geometric deformation of facial features, such as cartoonization. For more general stylization, image-to-image (I2I) translation may be used to translate an input image from a source domain to a target domain.

Conditional generative adversarial networks (GAN) may be implemented to learn the input-to-output mapping. Similar ideas have been applied to various tasks, such as sketches-to-photographs and attribute-to-images. For example, the well-known cycle-consistency loss in Cycle-GAN has been proposed to improve network training stability for the unpaired setting. Unsupervised methods have also been used in cartoonization. Further, CycleGAN has been extended to cross-domain anime portrait generation, and other unsupervised methods have incorporated an attention module and a learnable normalization function for cartoon face generation, where their attention-guided model can flexibly control the amount of change in shape and texture.

Recently, an image interpolation and stylization framework for controllable cross-domain image synthesis, called Toonify, has been proposed to generate photo-realistic cartoonization. Such framework, referred to as GANs, have been used to synthesize images that ideally match the training dataset distribution via adversarial training. GANs have been applied to various areas, including but not limited to image inpainting, image manipulation, and texture synthesis. Various advancements have been made to improve the architecture, synthesis quality, and training stability of GANs.

Since GANs are typically designed to generate realistic images by sampling from a known distribution in latent space, GAN inversion addresses the complementary problem of finding the most accurate latent code, when given an input image, that will reconstruct that image. One approach is based on optimization, which is directly optimizing the latent code to minimize the pixel-wise reconstruction loss for a single input instance. Another approach is learning-based, in which a deterministic model is trained by minimizing the difference between the input and synthesized images. Other works combine these the optimization and learning-based approaches by learning an encoder that produces a good initialization for subsequent optimization. In addition to image reconstruction, some examples also use inversion when undertaking image manipulation. For example, a hybrid method may encode images into a semantic manipulable domain for image editing. In addition, a generic Pixel2Style2Pixel (PSP) encoder has been proposed; such an encoder is based on a dedicated identity loss for embedding images in several real image translation tasks, such as inpainting and super resolution.

It is to be understood that any of the above means of image stylization may be incorporated into the systems and methods as disclosed herein, as well as other suitable types of image stylization as known in the art. The examples listed are not to be understood as limiting, but instead offer a portion of all possible image stylizations means which may be utilized.

Figure 1:
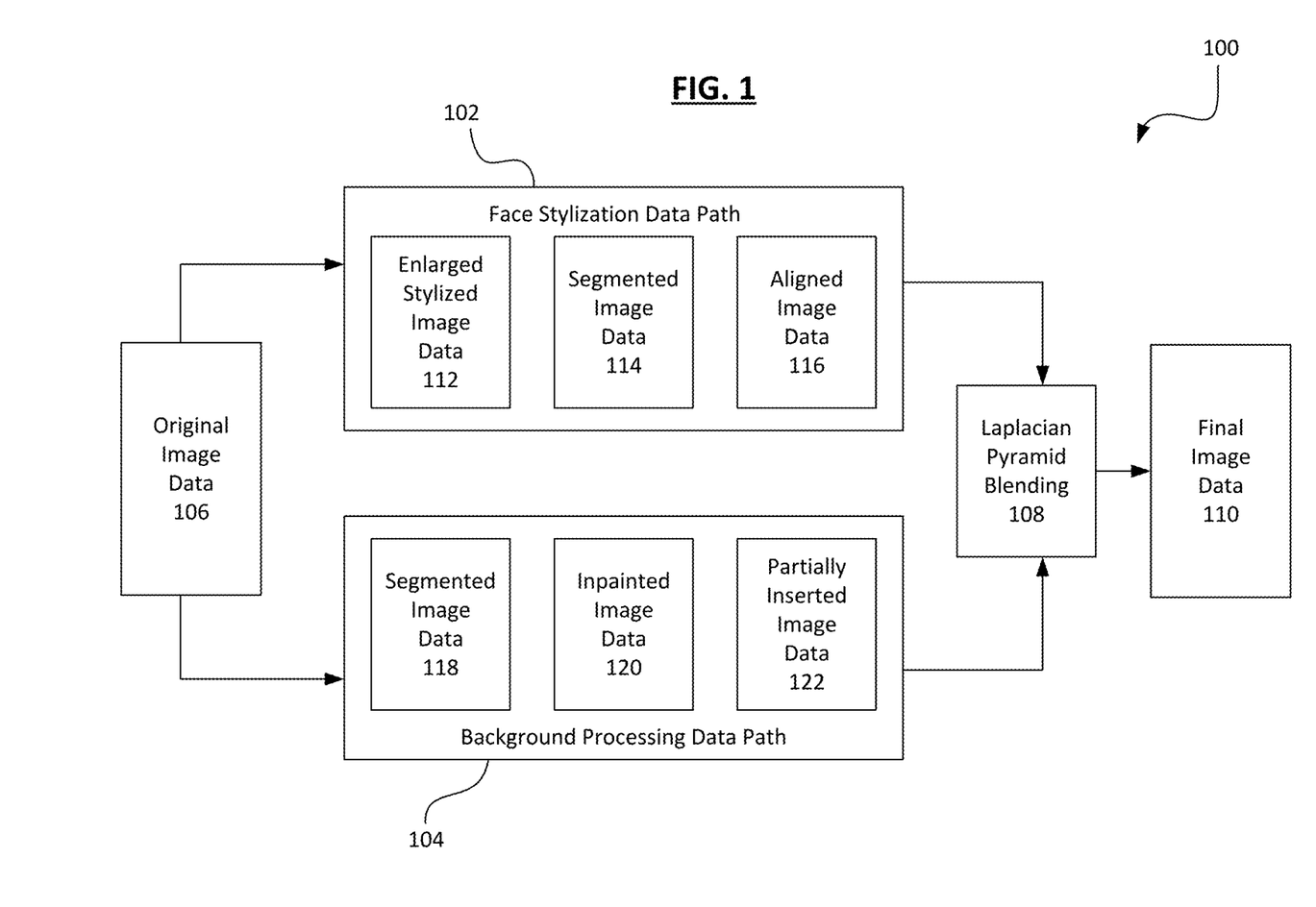
FIG. 1 depicts an exemplary dataflow of a stylized image generation system implementing the image stylization and blending methods in accordance with examples of the present disclosure.

FIG. 1 depicts an example of a dataflow process 100 in which the data, e.g. image data, is modified in a plurality of ways before a final stylized image data is obtained. The dataflow process 100 includes two main data paths: a face stylization data path 102 and a background processing data path 104. These two data paths operate independently of each other, that is, they are two separate and distinct processes. In some examples, these data paths may be implemented simultaneously or sequentially, that is, one after the other, as suitable.

The input image is original image data 106 for both of the data paths 102 and 104. The original image data 106 may be obtained from a user or obtained using image capturing means such as digital camera, scanner, and/or screen capture, among others. The original image data 106 may be a single image, for example a digital photograph, or a sequence of images, for example a video clip, in which case each image of the sequence may be processed sequentially.

In the face stylization data path 102, the obtained original image data 106 is transformed into enlarged stylized image data 112. The image data 112 is generated by stylizing the original image 106 and then enlarging the stylized image by a predetermined factor. In some examples, the stylization is applied only to the face region of the original image, and in some examples, the original image is cropped to show only the head region of the person in the image before the stylization is applied. In some examples, the enlarged image may be between 5% to 10% of the original image. In some examples, the enlargement is determined by increase in the number of image pixels in each dimension, for example between 10 to 100 pixels.

Determining where the face or head region is may be facilitated using segmentation, or more particularly human parsing segmentation. The segmentation may identify occlusion in the image, such as an object or person partially blocking the image of another person whose face is to be stylized, for example. When occlusion is identified, some of the occlusion may be recovered using human parsing segmentation, such as using artificial learning to determine the occluded portion in the image.

Also in the face stylization data path 102, segmented image data 114 is generated based on the stylized version of the original image data prior to enlargement. The segmentation provides boundaries between the background of the image and the foreground, e.g. the person whose face and/or body is to be stylized, be used to determine or mask the face region in the original image data. The segmentation may further provide boundaries between the different parts of the person to be analyzed, for example the face, hair, accessories, and/or clothes, etc. The boundaries provide means of separating each of these different parts as well as facilitating computer-based image recognition to determine the identity of each part and label them as such, e.g. understanding where the face of the person is located in the image and subsequently labeling the region corresponding to the face.

Another image generated in the face stylization data path 102 is aligned image data 116, which may be implemented when the original image data 106 is not aligned for stylization. For example, when the person in the original image is positioned diagonally with respect to the frame of the image, e.g. when the camera was positioned diagonally when taking the picture, the original image may require a normalization process that rotates the image by a certain degree such that the centerline of the face is substantially perpendicular or upright with respect to the top or bottom frame of the original image. The normalized original image may then be stylized and enlarged to form the enlarged stylized image data 112. In such case, the enlarged stylized image data 112 is then realigned with respect to the original image to generate the aligned image data 116, in which the face (which may be determined based on the segmented image data 114) is aligned with that of the original image data 106.

In the background processing data path 104, the original image data 106 is transformed into segmented image data 118. The segmentation may be similar to that which is used to generate the segmented image data 114, which generates boundaries of different components or parts within the image. In some examples, the original image data 106 is first processed through the aforementioned stylization process, and the stylized image data may be used in generating the segmented image data 118 of the stylized image. In some examples, the stylization in the background processing data path 104 may be different from the stylization in the face stylization data path 102, such as having a different art style (e.g., a cartoonish style for the face stylization data path and an oil painting style for the background processing data path) or using a different image interpolation method (e.g., different GAN models or models which uses different data sets for training), etc.

The background processing data path 104 also generates inpainted image data 120 based on the stylized image data. Inpainting as described herein involves removing a portion of the image and filling the removed portion of the image with colors selected from the regions surrounding it. In this case, the region of the image data pertaining to the face of the person in the image is determined using the segmented image data 118, and the face region is removed. Thereafter, colors from the regions surrounding the face region, for example the colors at the border of the removed region, are used to fill the inside of the removed region, as suitably determined.

The background processing data path 104 also generates partially inserted image data 122 where the original image data 106 is partially inserted into the inpainted image data 120. For example, the face region of the original image data 106 may be inserted into the inpainted image data 120 such that the removed region (which has since been inpainted) includes the original face image from the original image data 106. Again, the segmented image data 118 may be used to determine or mask the face region in the original image data 106 for the face image to be used in the partially inserted image data 122.

Machine-assisted blending includes any one of the numerous types of blending processes as known in the art. The blending may be machine-assisted in the sense that a machine, for example a computer or a network of computers, is implemented in performing the calculations necessary to facilitate the blending, where blending is defined as combining two or more images (or video clips) in a substantially seamless manner so as to reduce unwanted visual artifacts such as pixilation and noise, for example. In human portrait applications, such unwanted visual artifacts generally tend to occur at or around the boundaries of the face region, such as at or near the neck, ears, or hairline, for example.

In a Laplacian pyramid blending process 108 following the two data paths 102 and 104, Laplacian pyramid blending or Gaussian pyramid blending, which is one example of machine-assisted blending, is applied to the enlarged stylized image data 112 (or, if the stylized image data has been normalized, the aligned image data 116 is used) and the inpainted image data 120, in order to further blend the two image data into a composite image to yield a better blended result in final image data 110. That is, the enlarged stylized image data 112 (or the aligned image data 116) and the inpainted image data 120 are blended such that the face region of the enlarged stylized image data 112 is blended into the inpainted face region of the inpainted image data 120 to produce the final blended result. In some examples, the partially inserted image data 122 is also included, along with the enlarged stylized image data 112 and the inpainted image data 120, in the blending process 108 to improve the smoothness of the blending in the resulting image. In some examples, when the partially inserted image data 122 is generated, the color of the added image (foreground) may be adjusted to at least partially match the color within the inpainted region (background) to enforce color consistency.

Figure 2:
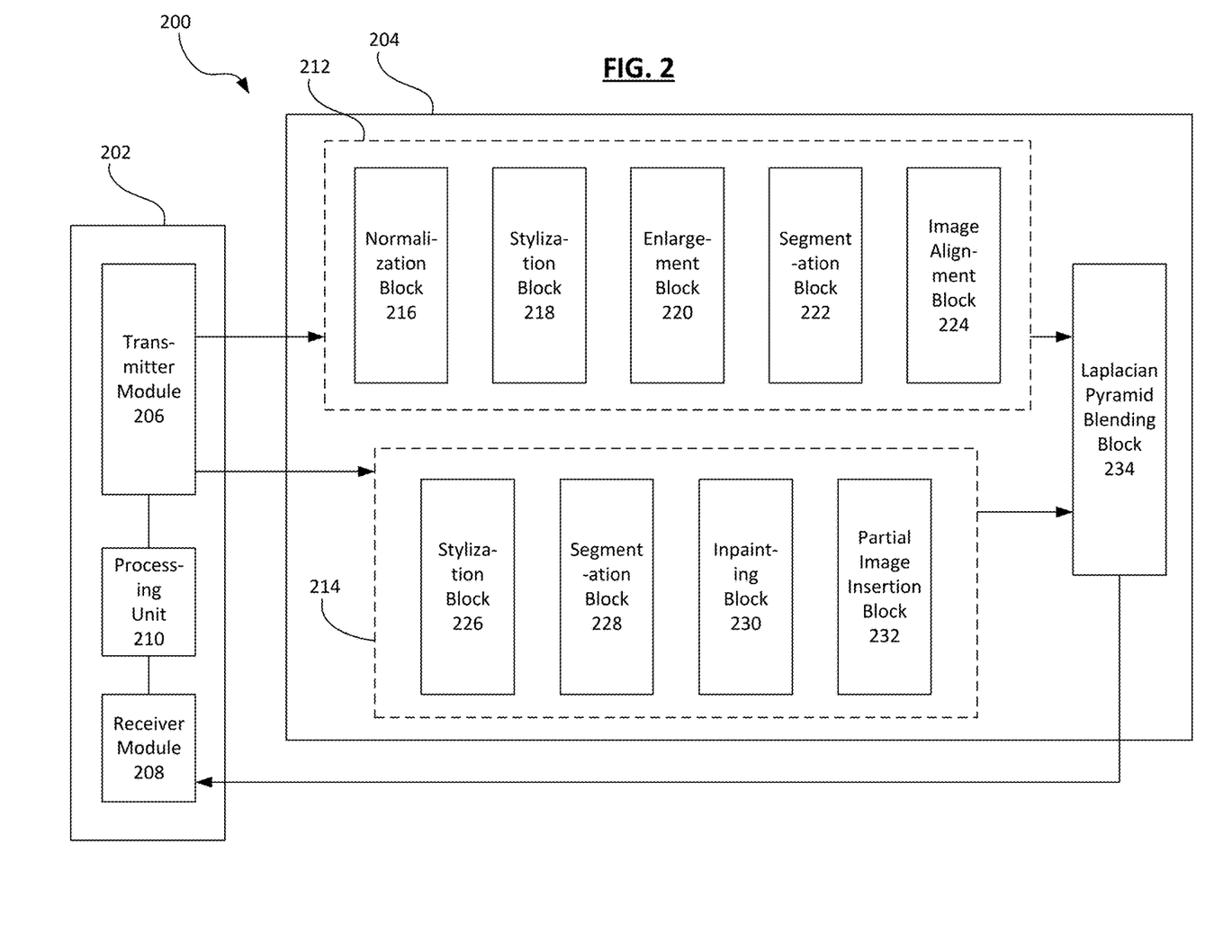
FIG. 2 depicts an exemplary processing or computing device capable of implementing the image stylization and blending methods for the stylized image generation system in accordance with examples of the present disclosure.

FIG. 2 depicts an exemplary computing system 200 which incorporates the dataflow process 100 of FIG. 1. In the example shown, a first component 202 and a second component 204 are implemented. The first component 202, also referred to as a user device, may include a mobile electronic device (e.g., smartphone), a personal computing device (e.g., notebook PC), a portable smart device (e.g., smart TV), a computing device with a user interface (e.g., electronic tablet), or any other suitable type of device which allows the user to provide the original image data 106 to be stylized. The second component 204, also referred to as an image processing device, may be a remote computing device such as a remote server to which the first component 202 may be operatively coupled via means of wired or wireless telecommunication such as the Internet or cloud networking, among others.

The user device 202 includes a transmitter module 206, a receiver module 208, and a processing unit 210 which controls the two modules 206 and 208. For simplicity, other subcomponents and modules of the user device 202 are not shown. The user provides the original image data 106 using any suitable means such as downloading from a website or server, taking a picture using a digital camera, generating an image using an image generator, etc., using the processing unit 210, which is transmitted via the transmitter module 206 to the image processing device 204.

The image is provided to two data processing modules, that is, a face image processing module 212 and a background image processing module 214. The face image processing module 212 includes a plurality of blocks, each including any suitable computing module or software algorithm, for example, to perform individually assigned tasks.

A normalization block 216 operates to normalize the original image such that the face in the image is positioned upright. A stylization block 218 operates to stylize the original image, or at least the face region of the image, after normalization. The style of the stylization block 218 may be selected by the user beforehand, which may be conveyed to the face image processing module 212 before, during, or after transmitting the original image. An enlargement block 220 operates to enlarge the image, or at least the face region of the image, after stylization. As previously explained, the amount of enlargement that is applied may vary with each image (e.g., by a determined percentage) or predetermined (e.g., by a certain range of pixels). The enlargement facilitates covering the primary artifacts when the stylized face image and the stylized background image are blended. A segmentation block 222 operates to partition the image into multiple segments such that different partitioned segments of the image are subsequently identified (e.g., face region, hair region, neck region, accessory region, clothes region, background region, etc.), which may be applied on the original image or the stylized image in order to determine the face region in order to perform the normalization, stylization, and/or enlargement. An image alignment block 224 operates to align the stylized image with facial position of the original image, if the face region of the original image required normalization.

The transmitter module 206 also transmits the original image data 106 to the background image processing module 214, which also includes a plurality of blocks, each including any suitable computing module or software algorithm, for example, to perform individually assigned tasks. A stylization block 226 operates to stylize the entirety of the original image, or in some examples, the original image excluding the face region. A segmentation block 228, similar to the segmentation block 222, operates to identify the different partitioned segments of the original image or the stylized image. An inpainting block 230 operates to remove the face region from the stylized image and fill in the region with surrounding color(s) as determined from analyzing the image. The inpainting facilitates removing the secondary artifacts when the stylized face image and the stylized background image are blended. A partial image insertion block 232 operates to insert or add the face region from the original image into the inpainted region of the stylized image. The color, brightness, and/or contrast of the face region from the original image may be adjusted accordingly to at least partially match or align with the color, brightness, and/or contrast of the stylized image.

A Laplacian pyramid blending block 234 receives the resulting images from both the face image processing module 212 (that is, the foreground image) and the background image processing module 214 (the background image) as well as the segmented image (the mask image) and blends the images together using the Laplacian pyramid blending technique, which facilitates preserving edge data while still blurring pixels. The final product, which is the blended stylized image data, is then transmitted to the user via the receiver module 208.

As known in the art, Laplacian pyramid blending performs the blending of two images (foreground and background) by resizing each image (which also includes the mask image) numerous times to form an image "pyramid" with the image at the bottom layer being the original image, each image in the layer above has half the width and height of the image in the layer below, and the top layer having the image of the smallest size. Then, the Laplacian pyramid of foreground and background are combined using the Gaussian pyramid of the mask image and implementing the following equation:

$$LS(i,j)=GR(i,j)*LA(i,j)+(1-GR(i,j))*LB(i,j) \quad \text{(Equation 1)}$$

where GR is the Gaussian pyramid of the mask, LA is the Laplacian pyramid of the foreground, LB is the Laplacian pyramid of the background, and LS is the combined pyramid from LA and LB. The general approach is to (1) build the Laplacian pyramids LA and LB from the foreground and background images, (2) build the Gaussian pyramid GR from the region selected by the mask image, (3) form the combined pyramid LS from LA and LB using the nodes of GR as weights with the Equation 1, and (4) collapse the LS pyramid to obtain the final blended image.

Figure 3:
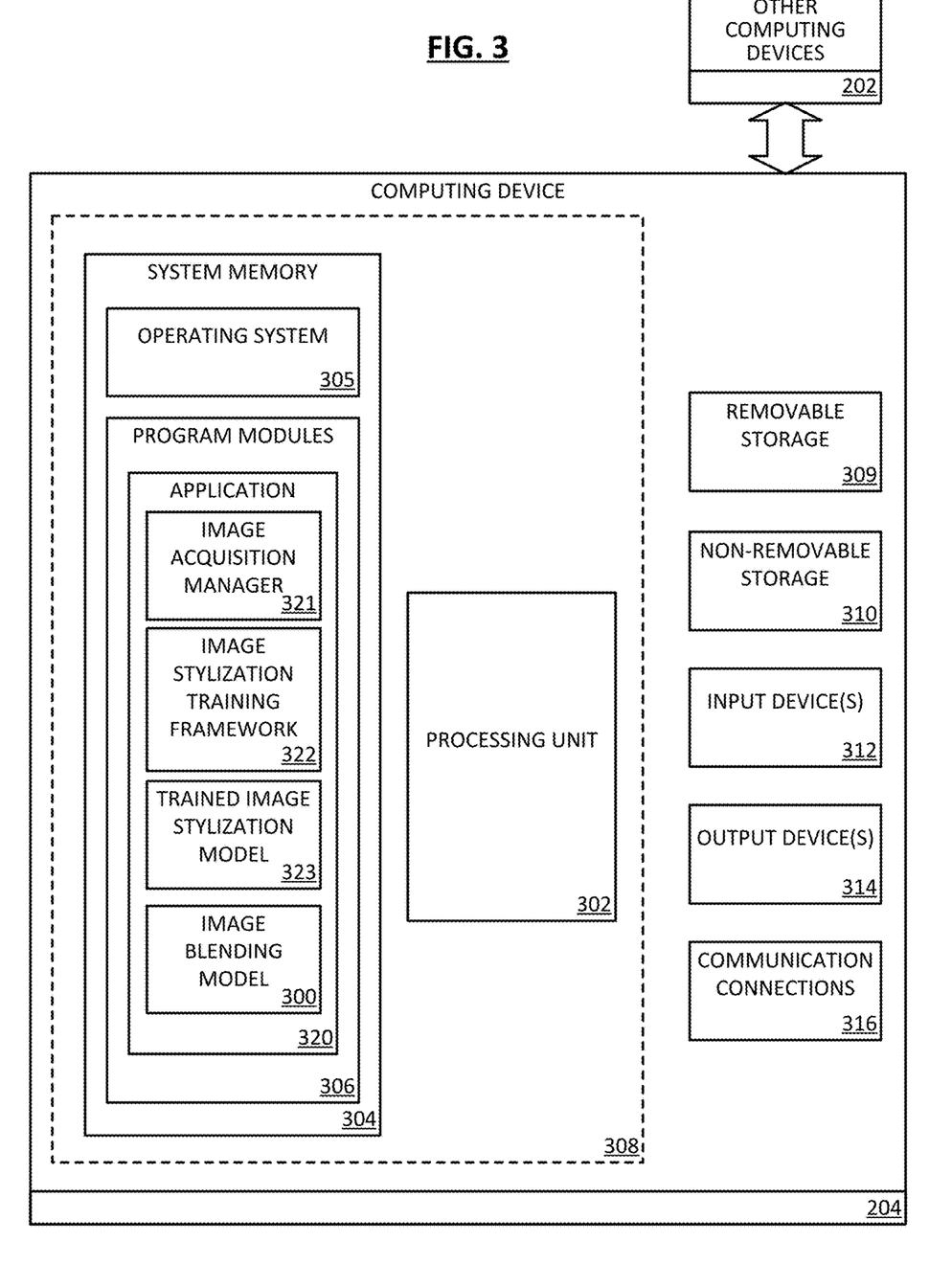
FIG. 3 depicts a block diagram illustrating physical components (e.g., hardware) of a computing system with which aspects of the disclosure may be practiced.
Figure 4:
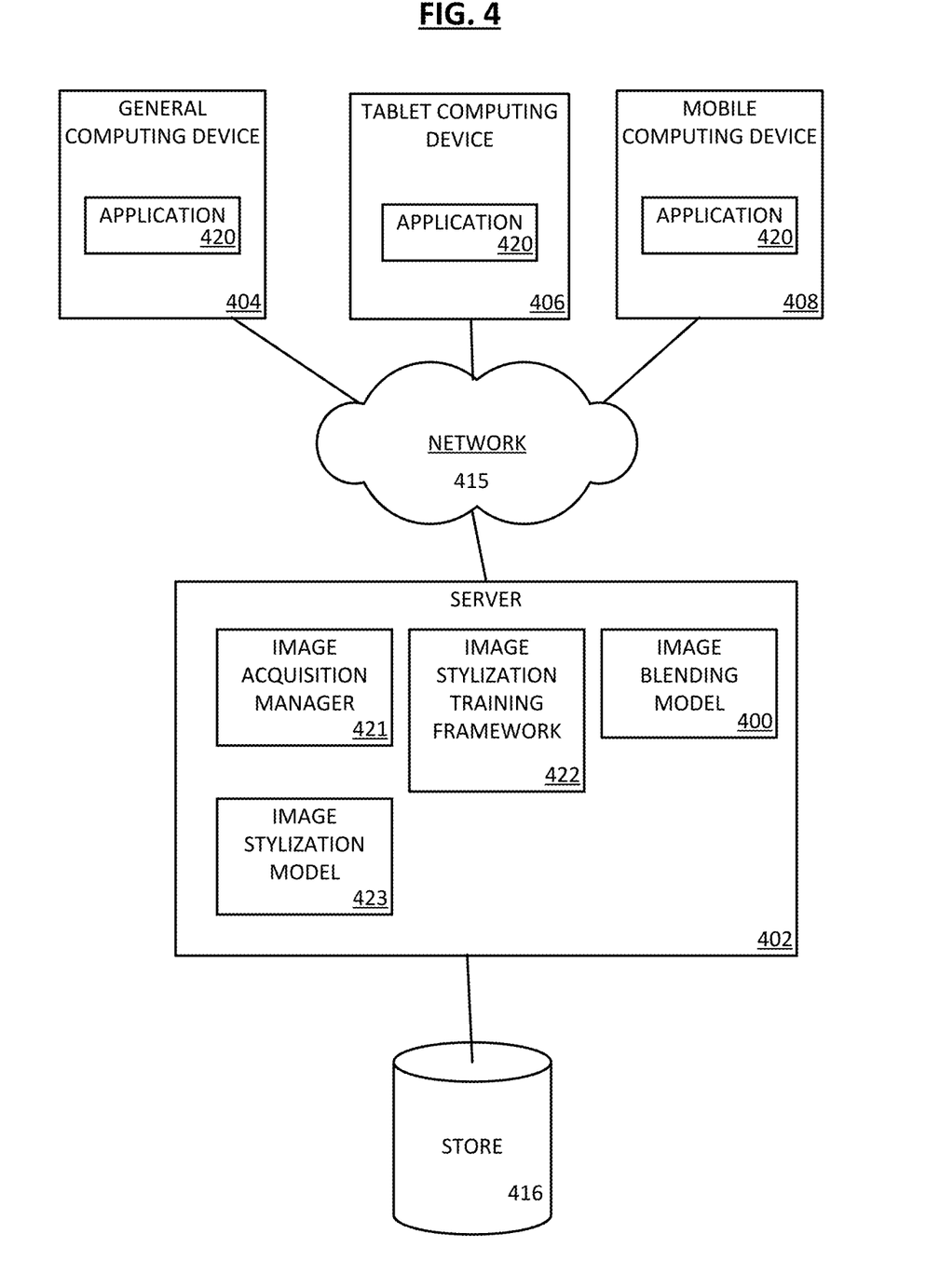
FIG. 4 illustrates one aspect of the architecture of a system for processing data.

FIGS. 3 and 4 and the associated descriptions provide a discussion of a variety of operating environments in which aspects of the disclosure may be practiced. An image blending models 300 and 400 in these figures represent the blocks or modules in FIG. 2 which facilitate the normalization (216), enlargement (218), segmentation (222 and 228), realignment (224), inpainting (230), partial image insertion (232), and Laplacian pyramid blending (234) of the images. However, the devices and systems illustrated and discussed with respect to FIGS. 3 and 4 are for purposes of example and illustration and are not limiting of a vast number of computing device configurations that may be utilized for practicing aspects of the disclosure, described herein.

FIG. 3 is a block diagram illustrating physical components (e.g., hardware) of a computing system 204 with which aspects of the disclosure may be practiced. The computing device components described below may be suitable for the computing and/or processing devices described above. In a basic configuration, the computing system 204 may include at least one processing unit 302 and a system memory 304. Depending on the configuration and type of computing device, the system memory 304 may comprise, but is not limited to, volatile storage (e.g., random-access memory (RAM)), non-volatile storage (e.g., read-only memory (ROM)), flash memory, or any combination of such memories.

The system memory 304 may include an operating system 305 and one or more program modules 306 suitable for running software application 320, such as one or more components supported by the systems described herein. As examples, system memory 304 may include the image acquisition manager 321, the image stylization model 322, and the trained image stylization model 323. The trained image stylization model 323 may be the same as or similar to the trained image stylization model 336 previously described. The operating system 305, for example, may be suitable for controlling the operation of the computing system 204.

Furthermore, embodiments of the disclosure may be practiced in conjunction with a graphics library, other operating systems, or any other application program and is not limited to any particular application or system. This basic configuration is illustrated in FIG. 3 by those components within a dashed line 308. The computing system 204 may have additional features or functionality. For example, the computing system 204 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 304. While executing on the processing unit 302, the program modules 306 (e.g., software applications 320) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 204 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 204 may also have one or more input device(s) 312 such as a keyboard, a mouse, a pen, a sound or voice input device, a touch or swipe input device, etc. The one or more input device 312 may include an image sensor. The image sensor may acquire an image and provide the image to the image acquisition manager 321. The output device(s) 314 such as a display, speakers, a printer, etc. may also be included. The aforementioned devices are examples and others may be used. The computing system 204 may include one or more communication connections 316 allowing communications with other computing devices/systems 202 as shown in FIG. 2. Examples of suitable communication connections 316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 304, the removable storage device 309, and the non-removable storage device 310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 204. Any such computer storage media may be part of the computing system 204. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 4 illustrates one aspect of the architecture of a system for processing data received at a computing system from a remote source, such as a personal computer 404, tablet computing device 406, or mobile computing device 408, as described above. The personal computer 404, tablet computing device 406, or mobile computing device 408 may include one or more applications 420; such applications may include but are not limited to the image acquisition manager 421, the image stylization training framework 422, and the trained image stylization model 423. Content at a server device 402 may be stored in different communication channels or other storage types. For example, various documents may be stored using a directory service, a web portal, a stylized image service, an instant messaging store, or social networking services.

One or more of the previously described program modules 306 or software applications 320 may be employed by server device 402 and/or the personal computer 404, tablet computing device 406, or mobile computing device 408, as described above. For example, the server device 402 may include the image acquisition manager 421, the image stylization training framework 422, and the trained image stylization model 423. The image acquisition manager 421 may be the same as or similar to the image acquisition manager 321 previously described. The image stylization training framework 422 may be the same as or similar to the image stylization training framework 322 previously described.

The server device 402 may provide data to and from a client computing device such as a personal computer 404, a tablet computing device 406 and/or a mobile computing device 408 (e.g., a smart phone) through a network 415. By way of example, the computer system described above may be embodied in a personal computer 404, a tablet computing device 406 and/or a mobile computing device 408 (e.g., a smart phone). Any of these examples of the computing devices may obtain content from the store 416, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
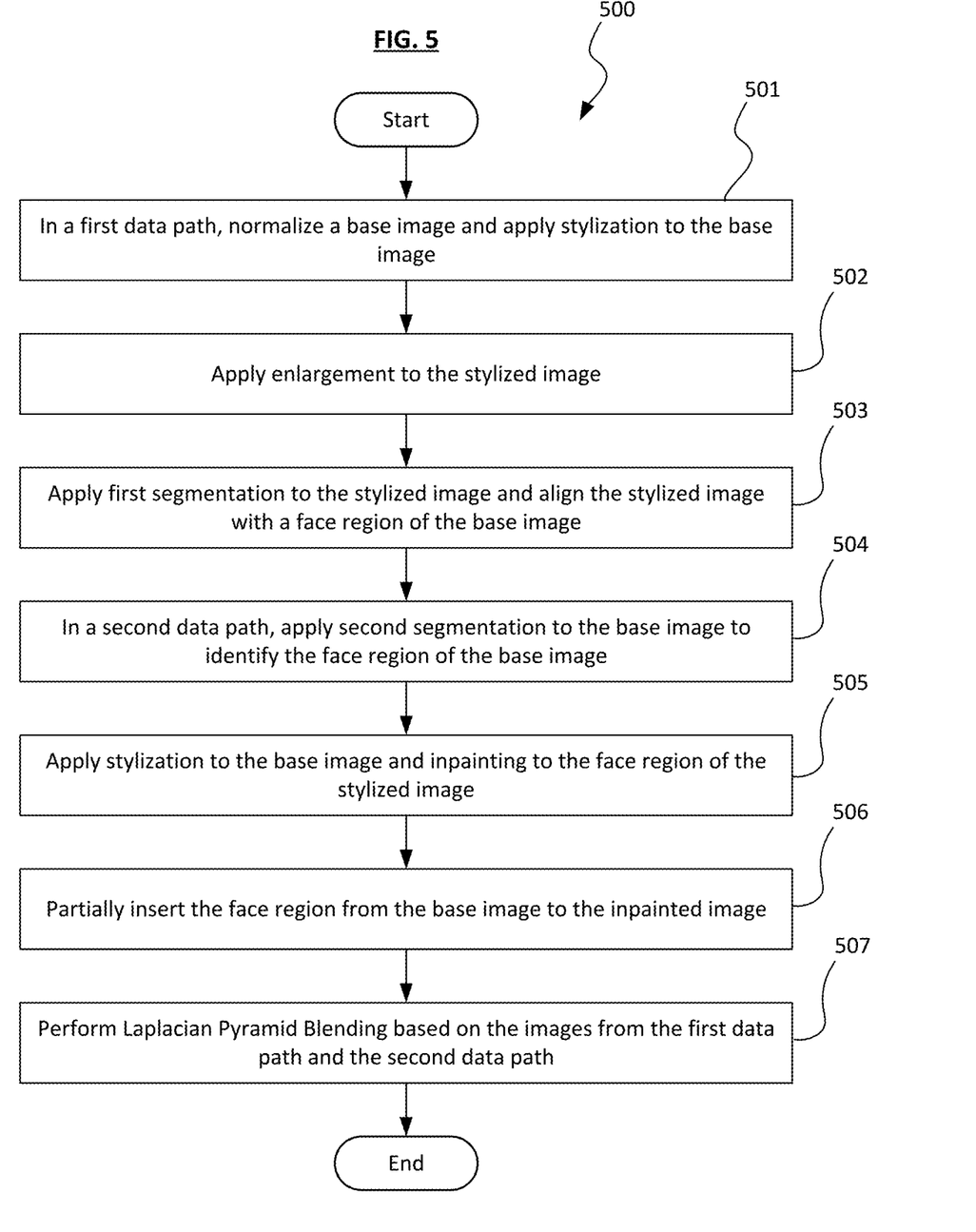
FIG. 5 depicts details of a method for generating a stylized image from an input image in accordance with examples of the present disclosure.

FIG. 5 depicts an exemplary process 500 for performing the image stylization and blending according to one embodiment. In step 501, in a first image data path, a base image that is obtained is normalized, if necessary, and stylization is applied to the normalized base image. In step 502, enlargement is applied to the stylized image. In step 503, a first segmentation is applied to the stylized image, and the stylized image is aligned with the base image, if the base image was normalized in step 501 prior to stylization, such that the face region of the stylized image, as identified via the first segmentation, is aligned with the face region of the base image.

In step 504, in a second data path, a second segmentation is applied to the base image to identify the face region of the base image. In step 505, stylization is applied to the entire base image, and inpainting is applied to the face region of the stylized image. In step 506, the face region from the base image, as identified using the second segmentation, is partially inserted to the inpainted image. Then, in step 507, Laplacian pyramid blending is performed based on the images obtained from the first data path and the second data path. The images include the foreground image, background image, and mask image necessary for the Laplacian pyramid blending: the foreground image is the stylized image from the first data path, the background image is the stylized, inpainted, and partially inserted image from the second data path, and the mask image is the base image or stylized image after segmentation to identify and mask the face region for blending.

Figure 6:
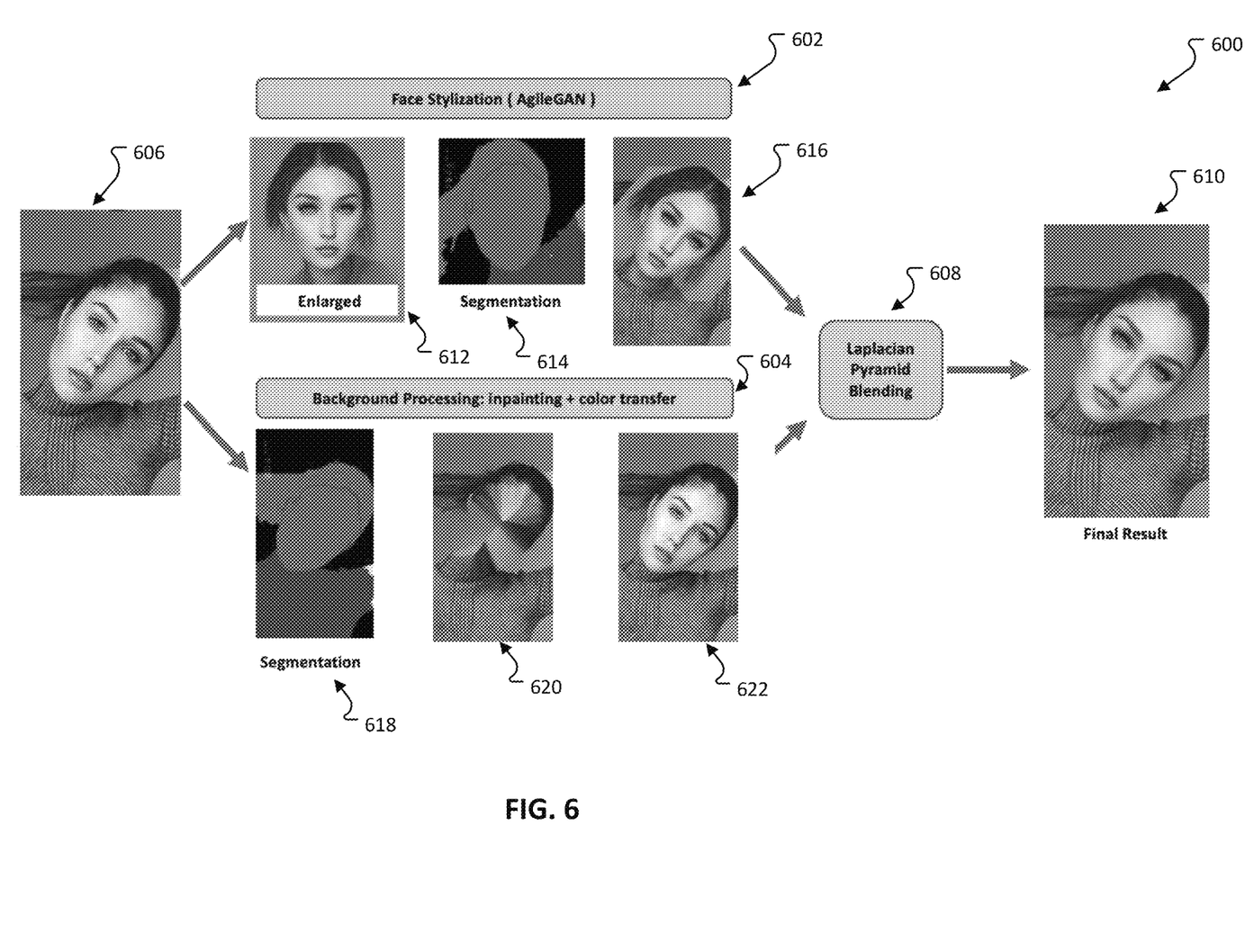
FIG. 6 depicts another exemplary dataflow of a stylized image generation system implementing the image stylization and blending methods in accordance with examples of the present disclosure.

FIG. 6 depicts an example of a dataflow process 600 in which the data, e.g. image data, is modified in a plurality of ways before a final stylized image data is obtained. The dataflow process 600 may be the same as or similar to the dataflow process 100 and includes two main data paths: a face stylization data path 602 and a background processing data path 604. The face stylization data path 602 may be the same as or similar to the face stylization path 102 and the background processing data path 604 may be the same as or similar to the background processing data path 104. The input image is original image data 606 for both of the data paths 602 and 604. The original image data 606 may be obtained from a user or obtained using image capturing means such as digital camera, scanner, and/or screen capture, among others. The original image data 606 may be a single image, for example a digital photograph, or a sequence of images, for example a video clip, in which case each image of the sequence may be processed sequentially.

In the face stylization data path 602, the obtained original image data 606 is transformed into enlarged stylized image data 612. The image data 612 is generated by stylizing the original image 606 and then enlarging the stylized image by a predetermined factor. In the face stylization data path 602, segmented image data 614 is generated based on the stylized version of the original image data prior to enlargement. Another image generated in the face stylization data path 602 is aligned image data 616, which may be implemented when the original image data 606 is not aligned for stylization. The aligned image may then be stylized and enlarged to form the enlarged stylized image data 612. In such case, the enlarged stylized image data 612 is then realigned with respect to the original image to generate the aligned image data 616, in which the face (which may be determined based on the segmented image data 614) is aligned with that of the original image data 606.

In the background processing data path 604, the original image data 606 is transformed into segmented image data 618. The background processing data path 604 also generates inpainted image data 620 based on the stylized image data. In this case, the region of the image data pertaining to the face of the person in the image is determined using the segmented image data 618, and the face region is removed. Thereafter, colors from the regions surrounding the face region, for example the colors at the border of the removed region, are used to fill the inside of the removed region, as suitably determined.

The background processing data path 604 also generates partially inserted image data 622 where the original image data 606 is partially inserted into the inpainted image data 620. For example, the face region of the original image data 606 may be inserted into the inpainted image data 620 such that the removed region (which has since been inpainted) includes the original face image from the original image data 606. Again, the segmented image data 618 may be used to determine or mask the face region in the original image data 606 for the face image to be used in the partially inserted image data 622.

In a Laplacian pyramid blending process 608, following the two data paths 602 and 604, Laplacian pyramid blending or Gaussian pyramid blending, which is one example of machine-assisted blending, is applied to the enlarged stylized image data 612 (or the aligned image data 616) and the inpainted image data 620, in order to further blend the two image data into a composite image to yield a better blended result in final image data 610. That is, the enlarged stylized image data 612 (or the aligned image data 616) and the inpainted image data 620 are blended such that the face region of the enlarged stylized image data 612 is blended into the inpainted face region of the inpainted image data 620 to produce the final blended result 610. The Laplacian pyramid blending process 608 may be the same as or similar to the Laplacian pyramid blending process 108. In some examples, the partially inserted image data 622 is also included, along with the enlarged stylized image data 612 and the inpainted image data 620, in the blending process 608 to improve the smoothness of the blending in the resulting image. In some examples, when the partially inserted image data 622 is generated, the color of the added image (foreground) may be adjusted to at least partially match the color within the inpainted region (background) to enforce color consistency.

The present disclosure relates to systems and methods for generating a stylized image according to at least the examples provided in the sections below:

(A1) In one aspect, some examples include a method for generating a stylized image, in which the method includes, in a first data path, (a) applying first stylization to an input image and (b) applying enlargement to the stylized image from (a). The method also includes, in a second data path, (c) applying segmentation to the input image to identify a face region of the input image and generate a mask image, and (d) applying second stylization to an entirety of the input image and inpainting to the identified face region of the stylized image. The method includes performing machine-assisted blending based on (1) the stylized image after the enlargement from the first data path, (2) the inpainted image from the second data path, and (3) the mask image to obtain a final stylized image.

(A2) In some examples of A1, the method further includes, in the second data path, (e) partially inserting the face region from the input image into the inpainted image from (d), and (f) performing color transfer between the input image and the partially inserted image from (e).

(A3) In some examples of A1-A2, the method further includes, in the first data path, (g) normalizing the input image prior to applying the first stylization in (a), (h) applying segmentation to the stylized image from (b) after applying the enlargement in (b) to identify the face region of the stylized image, and (i) aligning the identified face region of the stylized image from (b) with the input image before the normalizing.

(A4) In some examples of A1-A3, the machine-assisted blending used in the method is Laplacian pyramid blending.

(A5) In some examples of A1-A4, the first stylization and the second stylization in the method are performed using at least one trained generative adversarial network (GAN) generator.

(A6) In some examples of A5, the trained GAN generator used in the method comprises an AgileGAN generator or a StyleGAN2 generator.

(A7) In some examples of A1-A6, the first stylization is different from the second stylization.

(A8) In some examples of A1-A7, the first data path and the second data path are implemented simultaneously.

(A9) In some examples of A1-A8, the first data path is implemented before or after the second data path.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

Advantages in implementing the methods and systems as disclosed herein include the capability of producing a blended and stylized image with fewer image artifacts such as pixilation at or around the portions of the image where the blending of the foreground and the background has occurred, as well as to enforce color consistency between the foreground and the background and recovering occlusions due to objects or persons blocking parts of the foreground or the background. Therefore, the blended and stylized image has fewer visual artifacts, with the blended result having an improved shape-wise and color-wise consistency.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a stylized image, the method comprising:
    in a first data path,
    applying first stylization to an input image to generate a first stylized image, and
    applying enlargement to the first stylized image to generate an enlarged stylized image;
    in a second data path,
    applying segmentation to the input image to identify a face region of the input image and generate a mask image,
    applying second stylization to an entirety of the input image and inpainting based on the identified face region to generate an inpainted image; and
    performing machine-assisted blending based on the enlarged stylized image from the first data path, the inpainted image from the second data path, and the mask image to obtain a final stylized image.

2. The method of claim 1, further comprising:
    in the second data path,
    partially inserting the face region from the input image into the inpainted image to generate a partially inserted image, and
    performing color transfer between the input image and the partially inserted image.

3. The method of claim 1, further comprising:
    in the first data path,
    prior to applying the first stylization, normalizing the input image,
    after applying the enlargement, applying segmentation to the enlarged stylized image to identify a face region of the enlarged stylized image, and
    aligning the identified face region of the enlarged stylized image with the input image before the normalizing.

4. The method of claim 1, wherein the machine-assisted blending is Laplacian pyramid blending.

5. The method of claim 1, wherein the first stylization and the second stylization are performed using at least one trained generative adversarial network (GAN) generator.

6. The method of claim 5, wherein the trained GAN generator comprises an AgileGAN generator or a Style-GAN2 generator.

7. The method of claim 1, wherein the first stylization is different from the second stylization.

8. The method of claim 1, wherein the first data path and the second data path are implemented simultaneously.

9. The method of claim 1, wherein the first data path is implemented before or after the second data path.

10. A system configured to generate a stylized image, the system comprising:
    a processor; and
    memory including instructions, which when executed by the processor, causes the processor to:
    in a first data path,
    apply first stylization to an input image to generate a first stylized image, and
    apply enlargement to the first stylized image to generate an enlarged stylized image;
    in a second data path,
    apply segmentation to the input image to identify a face region of the input image and generate a mask image, and
    apply second stylization to an entirety of the input image and inpainting based on the identified face region to generate an inpainted image; and
    perform machine-assisted blending based on the enlarged stylized image from the first data path, the inpainted image from the second data path, and the mask image to obtain a final stylized image.

11. The system of claim 10, wherein the instructions, when executed by the processor, cause the processor to:
    in the second data path,
    partially inserting the face region from the input image into the inpainted image to generate a partially inserted image, and
    performing color transfer between the input image and the partially inserted image.

12. The system of claim 10, wherein the instructions, when executed by the processor, cause the processor to:
    in the first data path,
    prior to applying the first stylization, normalize the input image,
    after applying the enlargement, apply segmentation to the enlarged stylized image to identify a face region of the enlarged stylized image, and
    align the identified face region of the enlarged stylized image with the input image before the normalizing.

13. The system of claim 10, wherein the machine-assisted blending is Laplacian pyramid blending.

14. The system of claim 10, wherein the first stylization and the second stylization are performed using at least one trained generative adversarial network (GAN) generator.

15. The system of claim 14, wherein the trained GAN generator comprises an AgileGAN generator or a Style-GAN2 generator.

16. The system of claim 10, wherein the first stylization is different from the second stylization.

17. The system of claim 10, wherein the first data path and the second data path are implemented simultaneously.

18. The system of claim 10, wherein the first data path is implemented before or after the second data path.

19. A non-transitory computer-readable storage medium including instructions, which when executed by a processor, cause the processor to:
    in a first data path,
    apply first stylization to an input image to generate a first stylized image, and
    apply enlargement to the first stylized image to generate an enlarged stylized image;
    in a second data path,
    apply segmentation to the input image to identify a face region of the input image and generate a mask image, and apply second stylization to an entirety of the input image and inpainting based on the identified face region to generate an inpainted image; and perform machine-assisted blending based on the enlarged stylized image from the first data path, the inpainted image from the second data path, and the mask image to obtain a final stylized image.

20. The non-transitory computer-readable storage medium of claim 19, wherein the instructions, which when executed by the processor, cause the processor to:

in the second data path, partially inserting the face region from the input image into the inpainted image to generate a partially inserted image, and performing color transfer between the input image and the partially inserted image; and in the first data path, prior to applying the first stylization, normalize the input image, after applying the enlargement, apply segmentation to the enlarged stylized image to identify a face region of the enlarged stylized image, and align the identified face region of the enlarged stylized image with the input image before the normalizing.

* * * * *